(12) United States Patent
Yamamoto et al.

(10) Patent No.: US 8,517,457 B2
(45) Date of Patent: Aug. 27, 2013

(54) CONSTRUCTION MACHINE PROVIDED WITH CAB

(75) Inventors: Keiji Yamamoto, Hiroshima (JP); Keiji Yamamoto, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/540,214

(22) Filed: Jul. 2, 2012

(65) Prior Publication Data

US 2013/0009423 A1      Jan. 10, 2013

(30) Foreign Application Priority Data

Jul. 4, 2011    (JP) ................................. 2011-147915

(51) Int. Cl.
*B60N 99/00*        (2006.01)
(52) U.S. Cl.
USPC .................................................... 296/190.07
(58) Field of Classification Search
USPC ........................... 296/190.03, 190.07, 190.08
See application file for complete search history.

(56) References Cited

U.S. PATENT DOCUMENTS

| | | | |
|---|---|---|---|
| 5,551,826 A * | 9/1996 | Todd et al. ..................... | 414/685 |
| 6,260,914 B1 * | 7/2001 | Nieminski et al. ........ | 296/190.08 |
| 7,237,830 B1 * | 7/2007 | Smith ...................... | 296/190.07 |
| 7,347,488 B2 * | 3/2008 | Hayes et al. .............. | 296/190.08 |
| 7,938,478 B2 * | 5/2011 | Kamimae ................ | 296/190.08 |
| 2004/0245806 A1 | 12/2004 | Mori et al. | |
| 2006/0261640 A1 | 11/2006 | Mori et al. | |
| 2009/0085377 A1 * | 4/2009 | Hayes et al. ............. | 296/190.07 |
| 2010/0176624 A1 * | 7/2010 | Kamimae ................ | 296/190.08 |
| 2010/0320803 A1 * | 12/2010 | Ishigami et al. ......... | 296/190.08 |

FOREIGN PATENT DOCUMENTS

| | | |
|---|---|---|
| JP | 2004-189089 | 7/2004 |
| JP | 3671790 | 4/2005 |
| JP | 2006-348509 | 12/2006 |

* cited by examiner

*Primary Examiner* — Lori Lyjak
(74) *Attorney, Agent, or Firm* — Oblon, Spivak, McClelland, Maier & Neustadt, L.L.P.

(57) ABSTRACT

Provided is a construction machine. The construction machine is provided with a lower propelling body and an upper slewing body. The upper slewing body has an upper frame, a cab disposed on a left portion or a right portion of the upper frame, and cab mounts. The cab mounts are disposed at lateral ends on each of front and rear portions of the cab respectively, including, on at least one of the front and rear portions, first and second outer-side cab mounts disposed at the outer side of lateral ends of the cab. The first and second outer-side cab mounts are juxtaposed with a small enough distance to receive a rollover load concurrently when the construction machine rolls over toward a side of the cab.

6 Claims, 5 Drawing Sheets

CONSTRUCTION MACHINE PROVIDED WITH CAB

BACKGROUND OF THE INVENTION

1. Field of the Invention

The present invention relates to a construction machine such as an excavator provided with a cab allowing an operator to enter therein.

2. Description of the Background Art

The background art of the present invention is described by an example of an excavator shown in FIGS. 6 through 8.

The excavator shown in FIGS. 6 through 8 is provided with a crawler-type lower propelling body 1, and an upper slewing body 2 loaded on the lower propelling body 1 to be slewable about an axis vertical to the ground. The upper slewing body 2 includes: an upper frame 3; a cab 4 serving as an operation room in which an operator is allowed to enter and disposed on a left portion or a right portion (generally, on the left portion) of the upper frame 3; a working attachment 6 having a boom 5 and the like and disposed on a lateral side (generally on a right side) of the cab 4 to be raised and lowered; and a counterweight 7 provided at a rear end of the upper frame 3.

A front left portion of the upper frame 3 constitutes a cab attachment portion 8 as shown in FIGS. 7 and 8. The cab 4 is loaded on the cab attachment portion 8 via a plurality of cab mounts 9. The cab mounts 9 are disposed at four corners on a bottom portion of the cab 4, in other words, disposed respectively at both ends in a lateral direction (left and right directions) of the construction machine on each of a front portion and a rear portion of the bottom portion in a longitudinal direction (front and rear directions) of the construction machine.

As disclosed in the specification and drawings of Japanese Unexamined Patent Publication No. 2004-189089 and Japanese Patent No. 3671790, each of the cab mounts 9 is formed as an anti-vibration mount which has an elastic member (normally made of an anti-vibration rubber material) and elastically supports the cab 4 so as to allow the cab 4 to be vertically and horizontally displaced relatively to the upper frame 3 within a predetermined range by the elastic deformation of the elastic member, thus damping vibrations of the cab 4 during driving. Besides, each of the cab mounts 9 exerts a resistive force, against a load acting on the cab 4 in such a direction as to remove the cab 4 from the cab attachment portion 8 of the upper frame 3 when the machine rolls over, by an elastic expansion of the elastic member of the cab mount 9.

Japanese Unexamined Patent Publication No. 2006-348509 discloses a machine which includes, in addition to conventional cab mounts to be disposed at four corners on a bottom portion of a cab, other damping mechanisms to be disposed at respective positions away inwardly of the cab from the rear-side right and left pair of cab mounts. These other damping mechanisms are additionally provided to enhance supportability of a rear portion of the cab, in view of a point that the front portion of the cab is provided with relatively a few reinforcing members which are light, in order to secure a front view, while the front portion of the cab is provided with relatively many reinforcing members which are heavy.

The excavator shown in FIGS. 6 through 8 has a drawback of requiring upsizing each of the cab mounts 9 to prevent the cab 4 from disengaging from the cab attachment portion 8 when the machine rolls over. Specifically, in the case where the excavator rolls over on the side of the cab 4, that is, on such one side of the right and left sides that the cab 4 is placed down (generally toward the left side), initially the cab 4 touches down the ground and then the excavator further rolls over about an outer-side upper end of the cab 4 as a support on the ground so that the lower propelling body 1 takes off the ground: at this stage, the outer-side upper end of the cab 4 receives an upward reaction force from the ground, which force acts on the cab 4 as a moment which rotates the cab 4 in such a direction as to remove a laterally outer end of the cab 4 from the upper frame 3, about a contact portion (generally, longitudinally extending axis) between a laterally inner-side lower end of the cab 4 and a vertical plate 3a shown in FIG. 7 (the vertical plate 3a is a plate member standing upright on the upper frame 3 for supporting the boom 5) as a support. In this occasion, a tensile load initially acts on the left-side cab mounts 9, 9 located on the laterally outer-side of the cab, and, only after the fracture of the left-side cab mounts 9, 9, the right-side cab mounts 9, 9 can receive the load. Hence, to prevent the cab 4 from removal from the upper frame 3a, there is demanded high support strength especially for the left portion of the cab 4. However, the arrangement as shown in FIGS. 6 through 8, in which the cab mounts 9 are equally disposed at the four corners on the bottom portion of the cab 4 respectively, cannot meet the aforementioned demand, and the cab 4 is hardly prevented from the removal without upsizing each of the cab mounts 9.

Japanese Unexamined Patent Publication No. 2006-348509 discloses an excavator additionally provided with other damping mechanisms at a rear portion of a cab; however, even in this type of excavator, the cab is hard to efficiently prevent from its removal. Since the disclosed additional damping mechanisms are provided at respective positions largely away from the rear-side left and right pair of cab mounts toward a laterally middle position to enhance weight supportability of the cab for the great weight of the rear portion of the cab, an outermost cab mount of the cab mounts is broken first, when the excavator rolls over, and only thereafter, the additionally provided damping mechanism disposed at the inner side of the broken cab mount receives the load. In other words, the cab mounts and the additionally provided damping mechanisms successively and individually receive the load, which hinders enhancing the strength for preventing the cab from removal, regardless of the addition of the damping mechanisms. In short, this technology is only capable of extending a time until the removal of the cab, not providing a fundamental solution.

There may be proposed another measure of adding a grapple other than the cab mounts to the upper frame side for preventing removal of a cab when the machine rolls over; however, this is not advantageous because of involving an intolerable increase in the number of assembling steps, cost, and required space for installation.

SUMMARY OF THE INVENTION

An object of the invention is to provide a construction machine including an upper frame and a cab, which can be effectively prevented from a removal from the upper frame, without upsized cab mounts. A construction machine to be provided by the invention includes a lower propelling body, and an upper slewing body loaded on the lower propelling body to be slewable about an axis vertical to the ground. The upper slewing body includes an upper frame, a cab provided on a right portion or a left portion of the upper frame and adapted to allow an operator to enter therein, and a plurality of cab mounts interposed between the cab and the upper frame. The cab mounts are disposed at respective lateral ends on front and rear portions of the cab respectively and configured to exert a resistive force against a load acting on the cab in such a direction as to remove the cab from the upper frame when the construction machine rolls over. The cab mounts include, on at least one of the front portion and the rear portion of the cab, a first outer-side cab mount and a second outer-side cab mount which are disposed at an outer side of the lateral ends of the cab. The first and second outer-side cab mounts are juxtaposed with a small enough distance to cause the first and second outer-side cab mounts to receive the load concurrently when the construction machine rolls over toward a side of the cab.

In the specification, the expression "the first and second outer-side cab mounts concurrently receive the load" includes not only a case where the load starts acting on the first and second outer-side cab mounts simultaneously, but also a case where the load starts acting on one of the first and second outer-side cab mounts and, before the one outer-side cab mount is ruptured, in other words, before the support of the cab by the one outer-side cab mount substantially disappears, the load is acted on the other of the first and second outer-side cab mounts.

These and other objects, features and advantages of the present invention will become more apparent upon reading the following detailed description along with the accompanying drawings.

DESCRIPTION OF THE PREFERRED EMBODIMENTS

Figure 6:
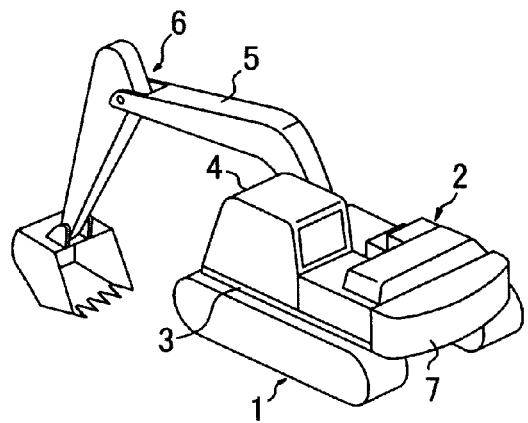
FIG. 6 is a schematic perspective view of a general excavator.
Figure 7:
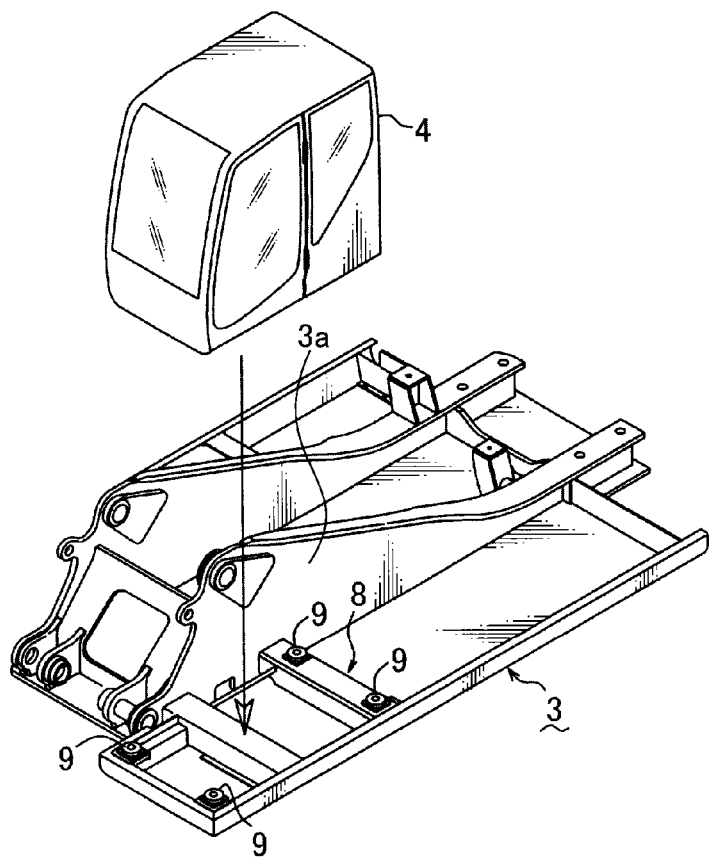
FIG. 7 is an exploded perspective view showing a positional arrangement of a cab and cab mounts according to the conventional art.
Figure 8:
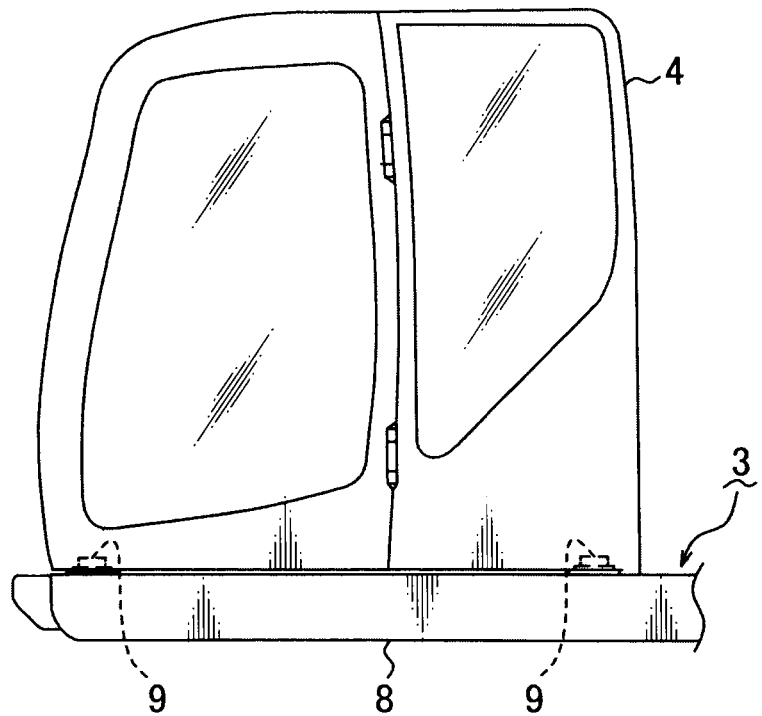
FIG. 8 is a side view showing an installation state of a cab according to the conventional art.

There are described a first embodiment, a second embodiment and a third embodiment of the invention referring to FIGS. 1 through 5. The first through third embodiments are examples, in which an excavator substantially the same as the excavator shown in FIG. 6 is applied to the invention. Specifically, the excavators of the first through third embodiments are substantially the same as the excavator shown in FIG. 6 except for a point that each of the excavators of the first through third embodiments is provided with an upper frame 11, a cab 12 and a plurality of cab mounts 14, 15, 16, 17A and 17B, in place of the upper frame 3, the cab 4 and the cab mounts 9 shown in FIGS. 6 through 8. A front left portion of the upper frame 11 constitutes a cab attachment portion 13, and the cab 12 is loaded on the cab attachment portion 13 via the cab mounts 14-16, 17A and 17B.

Figure 1:
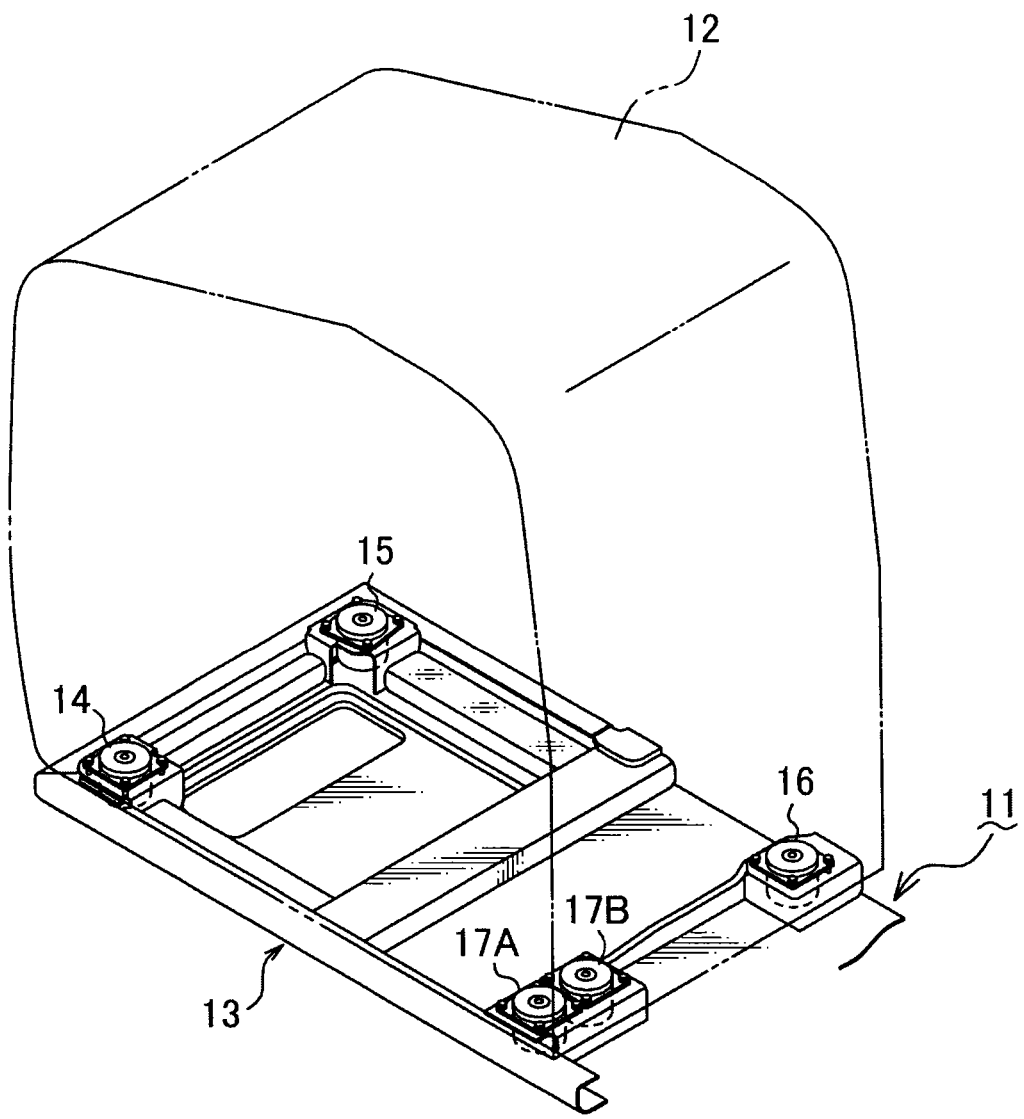
FIG. 1 is a perspective view of a cab attachment portion of an upper frame of an excavator in accordance with a first embodiment of the invention.
Figure 2:
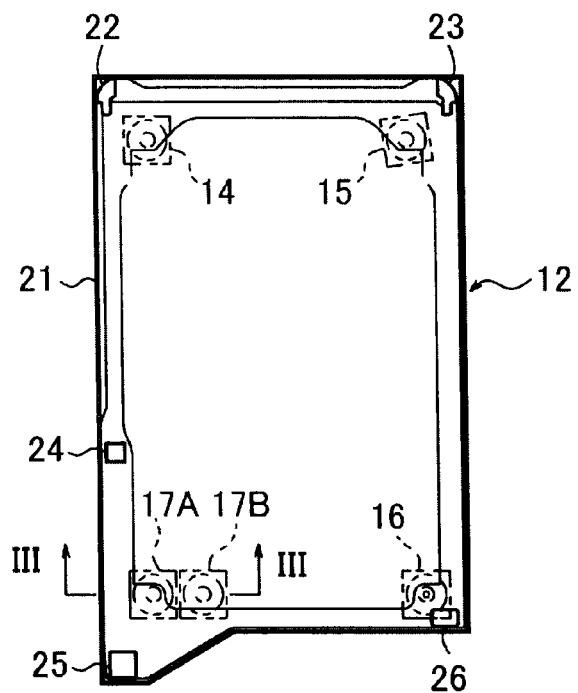
FIG. 2 is a horizontal sectional view of a cab to be attached to the cab attachment portion.
Figure 3:
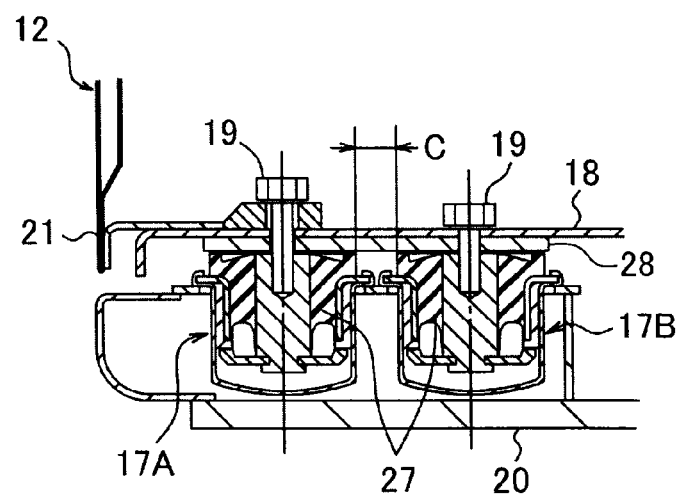
FIG. 3 is an enlarged sectional view taken along the line III-III in FIG. 2, showing a structure for supporting a rear portion of the cab.

The first embodiment is described referring to FIGS. 1 through 3.

The first embodiment includes the following arrangement: the cab mounts 14, 15 and 16 are disposed at a front-side left position, a front-side right position and a rear-side right position, that is, a laterally inner side of the cab, of the cab attachment portion 13, respectively; the cab mounts 17A and 17B corresponding to a first outer-side cab mount and a second outer-side cab mount of the invention respectively are juxtaposed laterally and possibly closely to each other, at a rear-side left position, i.e., at a laterally outer side of the cab. Hereinafter, when the distinction between the cab mounts 17A and 17B is required, the cab mounts 17A and 17B will be called as a "first rear-side outer-side cab mount 17A" and a "second rear-side outer-side cab mount 17B", respectively.

All the cab mounts 14 through 16, 17A and 17B, which are the same products, in other words, have the same shape (a shape having a tubular outer surface), size, structure as each other, are attached to a bottom plate 18 disposed on an inner side of a left-side panel 21 of the cab 12 as shown in FIG. 3, by bolts 19, and disposed on a bottom plate 20 of the upper frame 11.

The cab 12 has a cab frame, which has a front left pillar 22, a front right pillar 23, a left middle pillar 24, a left rear pillar 25 and a right rear pillar 26, as shown in FIG. 2. As described above, a rear portion of the cab 12 is constituted of a large number of reinforcing members to have high strength and high rigidity as compared with a front portion of the cab 12. The first rear-side outer-side cab mount 17A and the second rear-side outer-side cab mount 17B are disposed near the base of the left rear pillar 25 having a highest strength and rigidity among the pillars 22 through 26.

Each of the cab mounts 14 through 16, 17A and 17B has an elastic member 27. The elastic member 27 is made of e.g. an anti-vibration rubber material. The cab mounts 14 through 16, 17A and 17B elastically support the cab 12 so as to allow the cab 12 to be vertically and horizontally displaced within a predetermined range by elastic deformation of the elastic members 27. Furthermore, each of the cab mounts is constructed so as to exert a resistive force, by elastic expansion of the elastic member 27, against a load acting on the cab 12 in such a direction as to remove the cab 12 from the upper frame 11. The specific reason is as follows. In the case where the excavator rolls over, especially on the side of the cab 4 shown in FIG. 7, that is, on such one side of the right and left sides that the cab 4 is placed down (generally toward the left side), initially the cab 4 touches down the ground and then the excavator further rolls over about an outer-side upper end of the cab 4 as a support on the ground so that the lower propelling body 1 takes off the ground: at this stage, the outer-side upper end of the cab 4 receives an upward reaction force from the ground, which force acts on the cab 4 as a moment which rotates the cab 4 in such a direction as to remove a laterally outer end of the cab 4 from the upper frame 3, about a contact portion (generally, longitudinally extending axis) between a laterally inner-side lower end of the cab 4 and a vertical plate 3a shown in FIG. 7 (the vertical plate 3a is a plate member standing upright on the upper frame 3 for supporting the boom 5) as a support. Hence, each of the cab mount should be designed to provide a resistance against the load due to the above moment.

In particular, the interval C between the first cab mount 17A and the second cab mount 17B is set to a small enough value to cause the left-side or the outer-side first cab mount 17A and the right-side or the inner-side second cab mount 17B to start exerting a resistive force in this order against a rollover load W, which means a load acting when the machine rolls over, in other words, a small enough value to cause the right-side or second rear-side outer-side cab mount 17B to start expanding during the inward and upward elastic-expansion of the elastic member 27 of the left-side first cab mount 17A due to the rollover load W initially acting on the left-side first cab mount 17A, i.e., before the rupture of the elastic member 27 of the first cab mount 17A. In short, the first and second outer-side cab mounts 17A and 17B are juxtaposed with a small enough distance to allow cab mounts 17A and 17B to receive the rollover load W concurrently. This arrangement enables the first and second outer-side cab mounts 17A and 17B to share the rollover load W between them, thereby inhibiting fracture of the first and second outer-side cab mounts 17A and 17B themselves to thus enhance the cab-removal-prevention effect, as compared with the conventional arts.

Particularly, in the first embodiment, the first and second cab mounts 17A and 17B start to exert a resistive force against the rollover load W in this order with a slightly small time lag; this permits, for example, a machine having a cab 12 designed to allow a slight deformation of the cab 12 due to an initial load when the machine rolls over to thereby obtain a shock-absorption effect, in other words, a machine to which the rollover load W is transmitted from the outer side to the inner side while being reduced, to exhibit an enhanced cab-removal-prevention effect.

Besides, the enhancement of the cab-removal-prevention effect eliminates the need for providing an additional grapple for cab removal prevention, other than the cab mounts 14 through 16, 17A and 17B, or allows the grapple to be miniaturized or simplified. This makes it possible to prevent the cab 12 from removal while not involving a disadvantage such as an increase in the number of assembling steps, cost, or installation space.

Moreover, the structure shown in FIG. 3 is further provided with a reinforcing member 28 which is disposed across the elastic members 27 of the first and second outer-side cab mounts 17A and 17B. The reinforcing member 28, which is fixed to the lower surface of the bottom plate 18 of the cab 12 to reinforce the bottom plate 18, is interposed between the respective elastic members 27 of the first and second outer-side cab mounts 17A, 17B, and the bottom plate 18 of the cab 12, and is fixed to the elastic members 27 by the bolts 19 for the above-mentioned fixture of the first and second outer-side cab mounts 17A and 17B to the bottom plate 18, respectively. The reinforcing member 28 enhances the integrity of the first and second outer-side cab mounts 17A and 17B to promote the load acting on the first outer-side cab mount 17A to also act on the second outer-side cab mount 17B. The shape of the reinforcing member 28 may be a flat plate shape as shown in FIG. 3, or may be a corrugated shape or a block-like shape.

Figure 4:
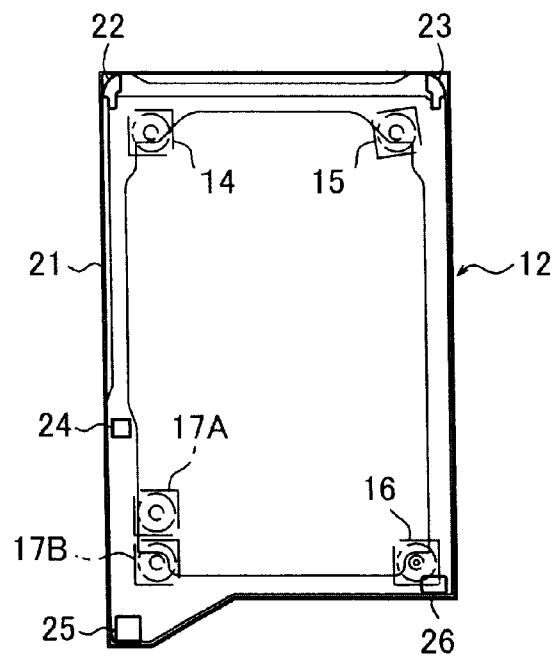
FIG. 4 is a horizontal sectional view of a cab in accordance with a second embodiment of the invention.

FIG. 4 is a plan view of a cab 12 according to a second embodiment of the invention. In the second embodiment, first and second cab mounts 17A and 17B are juxtaposed longitudinally with a small enough distance to cause the first and second cab mounts 17A and 17B to start exerting a resistive force concurrently against the rollover load W. This positional arrangement enables the first and second cab mounts 17A and 17B to receive the rollover load W from an initial stage when the machine rolls over. Hence, the second embodiment is particularly advantageous in cab removal prevention, for example, in a machine having a cab designed to prevent deformation of the cab at an initial load, in other words, in a machine which provides no expectation of shock absorption effect against an initial load.

Figure 5:
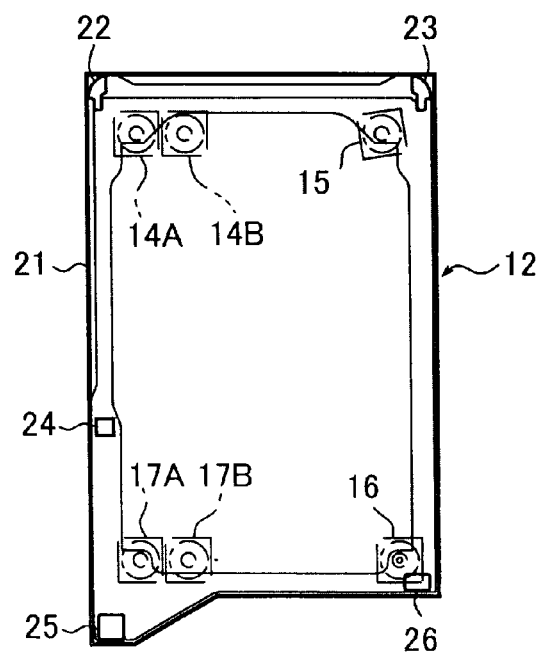
FIG. 5 is a horizontal sectional view of a cab in accordance with a third embodiment of the invention.

FIG. 5 is a plan view of a cab 12 according to a third embodiment of the invention. The third embodiment includes a first front-side outer-side cab mount 14A and a second front-side outer-side cab mount 14B, which are juxtaposed closely to each other, in place of the single cab mount 14 disposed at the front-side outer-side (left-side) of the cab 12 as in the first embodiment. Specifically, in the third embodiment, the first and second front-side outer-side cab mounts 14A and 14B juxtaposed laterally and closely and the first and second rear-side outer-side cab mounts 17A and 17B are arranged at the outer side (left side) on a front portion and a rear portion of the cab 12, respectively. This arrangement allows the left and right cab mounts 14A and 14B, and the left and right cab mounts 17A and 17B to share a rollover load W at front and rear ends of the cab 12 respectively, thereby enhancing the cab-removal-prevention effect.

The invention is not limited to the first through third embodiments but may include various modifications obvious to persons skilled in the art having common knowledge and skills in the art. For instance, the invention may include an embodiment in which first and second outer-side cab mounts are juxtaposed laterally or longitudinally only at a front-side outer side of a cab, and an embodiment in which first and second outer-side cab mounts are juxtaposed longitudinally at an outer side on respective front and rear ends of a cab. Furthermore, the invention does not preclude juxtaposing, in addition to first and second outer-side cab mounts, one or more cab mounts for a large-sized cab or a large-sized and heavy-weighted excavator. Besides, the invention does not preclude disposing, in addition to cab mounts at lateral ends on longitudinal ends of a cab, another cab mount at a position other than the above position, e.g. at a laterally middle position, of the cab. In addition, the invention may be applied to an excavator having a cab disposed on a right portion of an upper frame, or to a construction machine other than an excavator, which machine has an upper frame and a cab disposed on a left portion or a right portion of the upper frame via a cab mount, similarly to the excavator.

As described above, the invention provides a construction machine including an upper frame and a cab, which can be effectively prevented from a removal from the upper frame, without upsized cab mounts. This construction machine includes a lower propelling body, and an upper slewing body loaded on the lower propelling body to be slewable about an axis vertical to the ground. The upper slewing body includes an upper frame, a cab provided on a right portion or a left portion of the upper frame and adapted to allow an operator to enter therein, and a plurality of cab mounts interposed between the cab and the upper frame. The cab mounts are disposed at respective lateral ends on front and rear portions of the cab respectively and configured to exert a resistive force against a load acting on the cab in such a direction as to remove the cab from the upper frame when the construction machine rolls over. The cab mounts include, on at least one of the front portion and the rear portion of the cab, a first outer-side cab mount and a second outer-side cab mount which are disposed at an outer side of the lateral ends of the cab. The first and second outer-side cab mounts are juxtaposed with a small enough distance to cause the first and second outer-side cab mounts to receive the load concurrently when the construction machine rolls over toward a side of the cab.

In the construction machine thus constructed, the first and second outer-side cab mounts juxtaposed closely to each other are able to concurrently receive a load acting on the cab in such a direction as to remove the cab from the upper frame and concurrently exert resistive forces respectively when the construction machine rolls over toward the side of the cab, thereby sharing the load. Hence, differently from the case where, only after one cab mount is rupture to lost the resistive force, another cab mount receives the load, the fracture of each of the cab mounts themselves can be effectively prevented to enhance the cab-removal-prevention effect. Furthermore, the arrangement of the first and second outer-side cab mounts eliminates the need for providing, in addition to the cab mounts, a grapple for preventing cab removal or enables the grapple to be miniaturized or simplified, thereby enhancing the cab detachment preventive effect without an intolerable increase in the number of assembling steps, the cost and the installation space.

Preferably, each of the first and second outer-side cab mounts may include an elastic member adapted to elastically support the cab and expand due to a load acting when the construction machine rolls over toward the side of the cab to thereby exert a resistive force against the load.

In the invention, it is preferable that the construction machine further includes a reinforcing member disposed across the respective elastic members of the first and second outer-side cab mounts and fixed to the elastic members. The reinforcing member enhances the integrity of the first and second outer-side cab mounts, and promotes the load acting on the first outer-side cab mount to also act on the second outer-side cab mount.

In the common case where the rear portion of a cab is constructed to have high strength and high rigidity as compared with the front portion of the cab, it is preferable that the first and second outer-side cab mounts are juxtaposed as respective rear-side outer-side cab mounts of the cab. This juxtaposition enhances the effect of preventing removal of the rear portion of the cab to effectively reduce deformation of the cab, thereby enabling a structure suitable for the ROPS (roll-over protective structure) standards for preventing deformation of a cab to be realized.

The first and second outer-side cab mounts can be juxtaposed, for example, in a lateral direction of the cab. This lateral juxtaposition enables the laterally outer-side cab mount of the first and second outer-side cab mounts to receive the load for the first time when the construction machine rolls over toward the side of the cab, and enables the other of the first and second outer-side cab mounts to start receiving the load so as to share the load with the laterally outer-side cab mount while the laterally outer-side cab mount receives the load, in other words, before the fracture of the laterally outer-side cab mount. Hence, the arrangement allows, for example, a machine having a cab designed to allow the cab to be slightly deformed due to an initial load when the machine rolls over to thus exhibit shock-absorption effect, in other words, a machine in which the load is transferred the load from the outer side toward the inner side of the machine while being reduced, to exhibit the enhanced cab-removal-prevention effect.

The first and second outer-side cab mounts may be juxtaposed longitudinally of the cab. This longitudinal juxtaposition enables the first and second outer-side cab mounts to share the load from an initial stage at the same timing when the construction machine rolls over toward the side of the cab substantially. Therefore, this juxtaposition enables, for example, a machine having a cab designed to prevent deformation of a cab due to an initial load, in other words, a machine providing no expectation of shock-absorption effect against an initial load, to exhibit the enhanced cab-removal-prevention effect.

This application is based on Japanese Patent Application No. 2011-147915 filed on Jul. 4, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine, comprising:
   a lower propelling body; and
   an upper slewing body loaded on the lower propelling body to be slewable about an axis vertical to the ground, wherein:
   the upper slewing body includes an upper frame, a cab provided on a left portion or a right portion of the upper frame and configured to allow an operator to enter therein, and a plurality of cab mounts interposed between the cab and the upper frame;
   the cab mounts are disposed at lateral ends on each of a front portion and a rear portion of the cab respectively and configured to exert a resistive force against a load acting on the cab in such a direction as to remove the cab from the upper frame when the construction machine rolls over; and
   the cab mounts include, on at least one of the front portion and the rear portion of the cab, a first outer-side cab mount and a second outer-side cab mount which are disposed at an outer side of the lateral ends of the cab, the first and second outer-side cab mounts being juxtaposed with a small enough distance to allow the first and second outer-side cab mounts to receive the load concurrently when the construction machine rolls over toward a side of the cab.

2. The construction machine according to claim 1, wherein each of the first and second outer-side cab mounts includes an elastic member for elastically supporting the cab, the elastic members being configured to elastically expand due to a load when the construction machine rolls over toward the side of the cab to thereby exert a resistive force against the load.

3. The construction machine according to claim 2, further comprising a reinforcing member disposed across the respective elastic members of the first and second outer-side cab mounts and fixed to the elastic members.

4. The construction machine according to claim 1, wherein the first and second outer-side cab mounts are juxtaposed as respective rear-side outer-side cab mounts of the cab mounts.

5. The construction machine according to claim 1, wherein the first and second outer-side cab mounts are juxtaposed laterally of the cab.

6. The construction machine according to claim 1, wherein the first and second outer-side cab mounts are juxtaposed longitudinally of the cab.

* * * * *